United States Patent [19]

Miller

[11] 4,145,994
[45] Mar. 27, 1979

[54] DIRECTIONAL AND LIMITING GATE

[76] Inventor: Thomas G. Miller, R.R. 1, Box 88, Burlington, Iowa 52601

[21] Appl. No.: 802,080

[22] Filed: May 31, 1977

[51] Int. Cl.² ........................................... A01K 29/00
[52] U.S. Cl. .................................................. 119/155
[58] Field of Search ............... 119/155, 99; 49/17, 49/49, 192, 193

[56] References Cited

U.S. PATENT DOCUMENTS

| 795,539 | 7/1905 | Parmelee | 49/193 X |
|---|---|---|---|
| 2,504,214 | 4/1950 | Miller | 119/155 |
| 3,072,099 | 1/1963 | Stevens | 119/155 |

FOREIGN PATENT DOCUMENTS

| 578603 | 10/1924 | France | 49/193 |
|---|---|---|---|
| 731278 | 6/1955 | United Kingdom | 49/193 |

*Primary Examiner*—Hugh R. Chamblee

*Attorney, Agent, or Firm*—Lockwood, Dewey, Alex & Cummings

[57] ABSTRACT

A directional and size limiting gate for controlling the flow of animals between adjacent pens. Vertically disposed frame members are spaced apart in the form of an equilateral triangle. Latch and hinge arrangements along each vertical door edge permits a door to open from, or pivot from, any one of the frame members. The door has tabs horizontally extending beyond the vertical edges of the door. Each side of the door has a control rod guided by apertures in the tabs, with the control arm having hinge pins thereon. The hinge pins secure the tabs of the door to hinge sockets at spaced locations along the vertically disposed frame members. Some horizontally disposed frame members have sockets for receiving bars, said sockets being variably positionable along the horizontal frame members for controlling the size of animal passing therebetween and/or for holding one edge of the door in a selected position.

2 Claims, 13 Drawing Figures

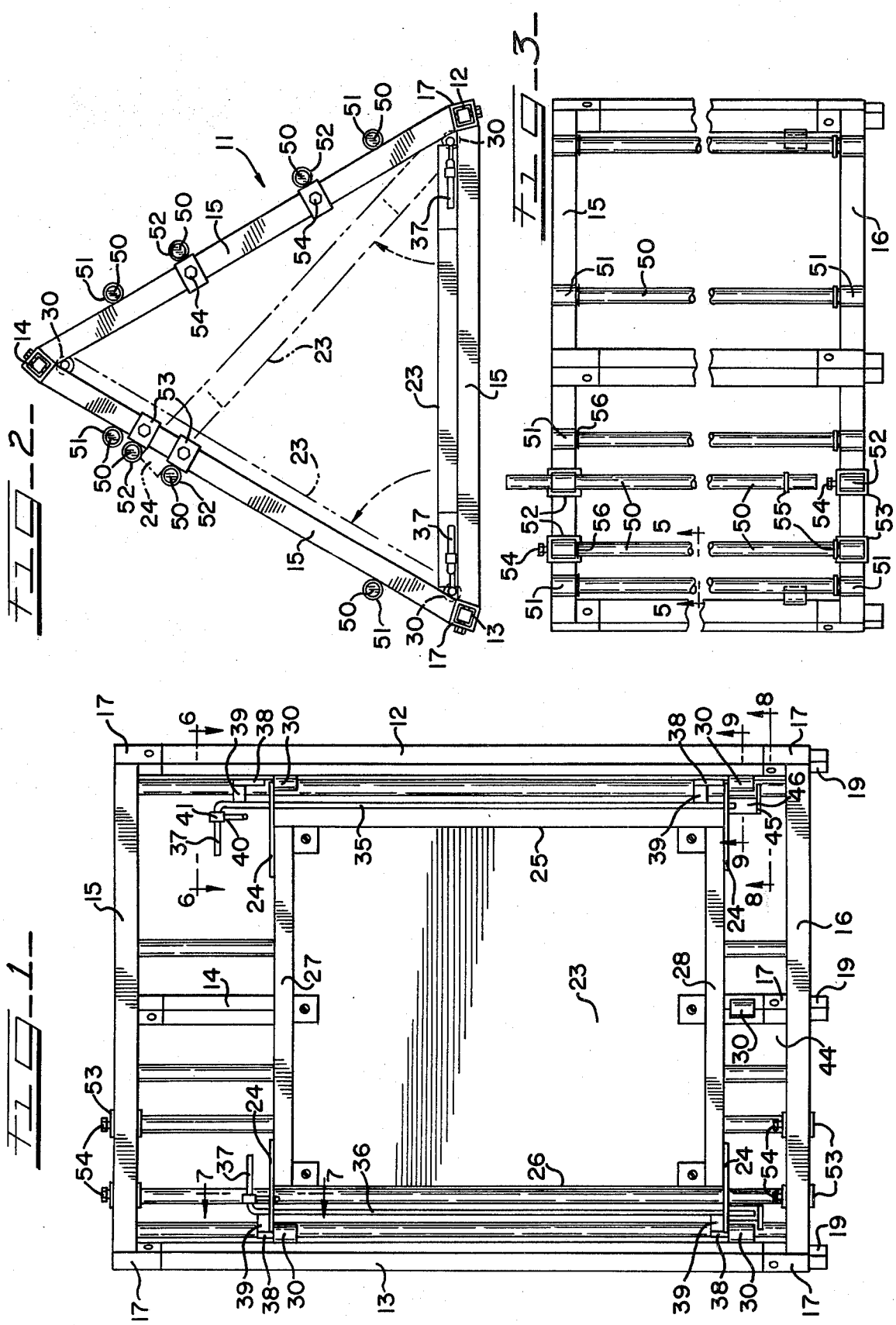

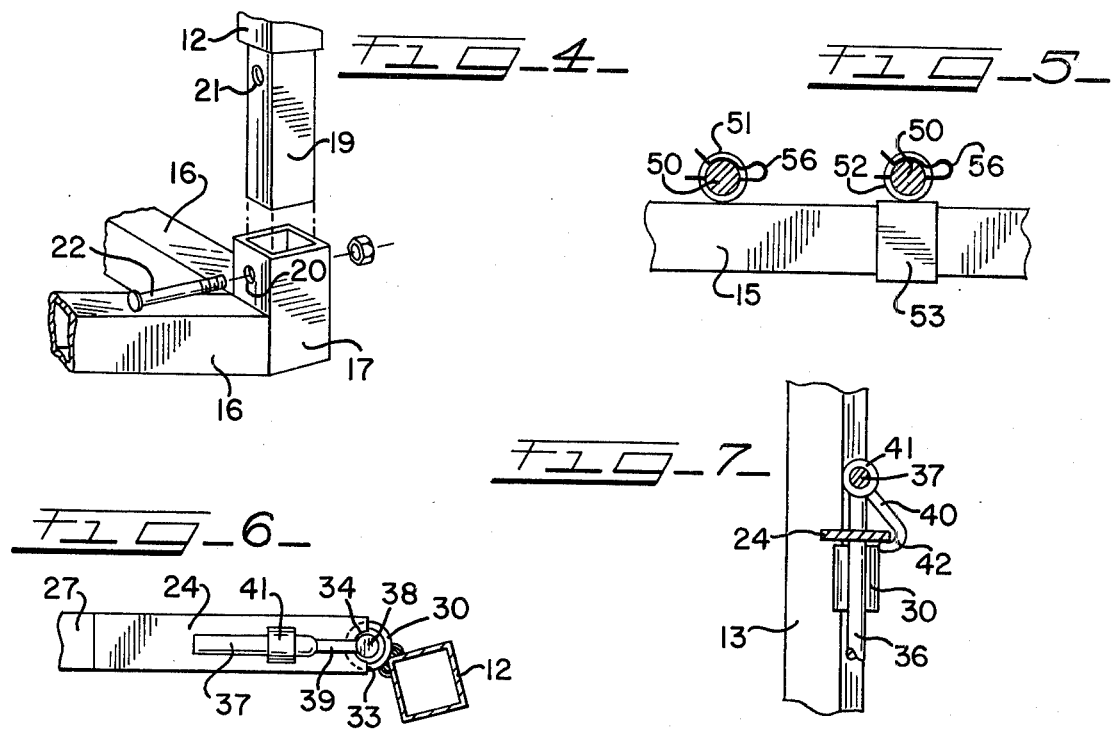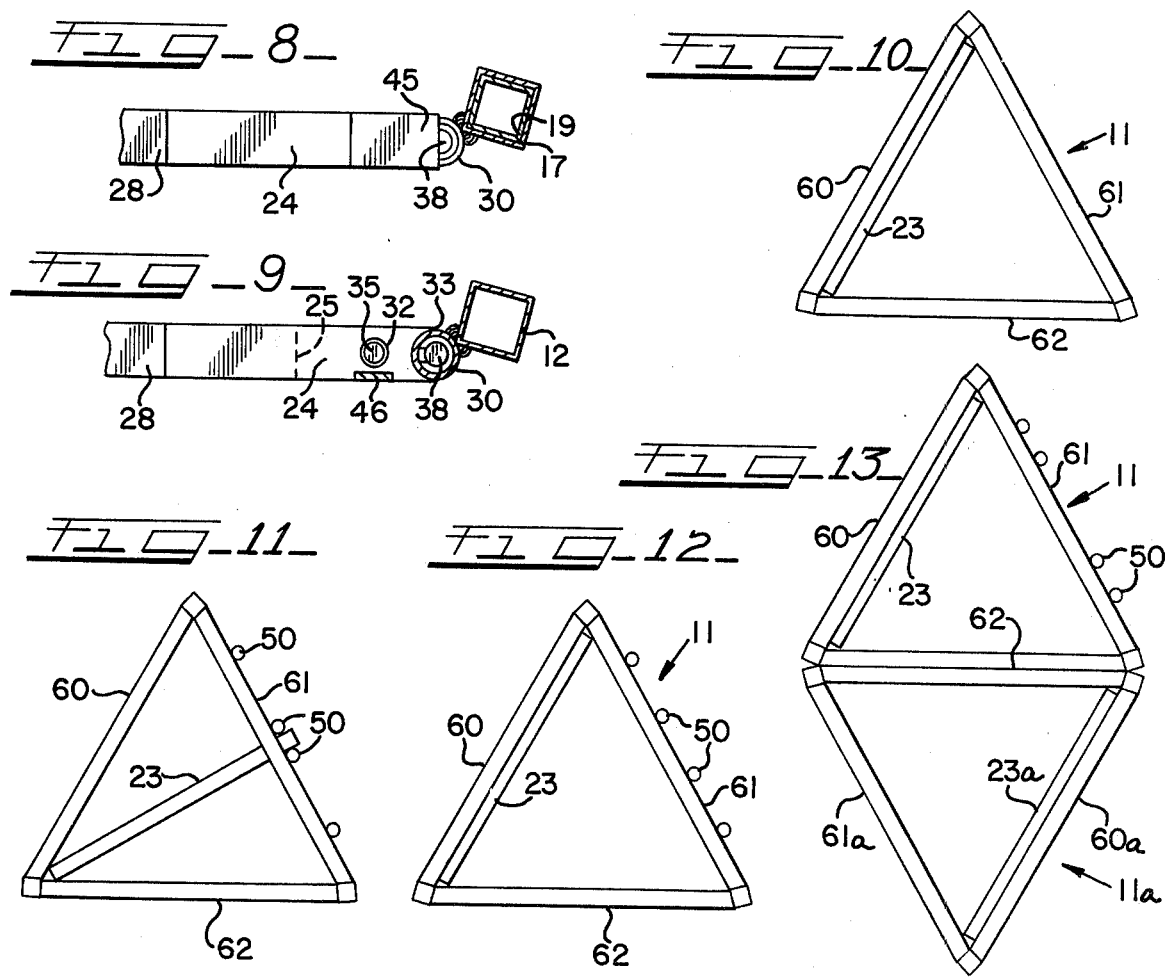

4,145,994

DIRECTIONAL AND LIMITING GATE

BACKGROUND OF THE INVENTION

This invention relates in general to gates for controlling the flow and size of animals passing therethrough, and more particularly to such a gate wherein a special latch and hinge arrangement enables a door of the gate to be opened from, or pivoted from, any vertically disposed frame member.

Various types of gates are known in the prior art for controlling the direction of flow or the size of animals, and especially livestock, passing therethrough. One such example in my U.S. Pat. No. 4,019,464 which issued on Apr. 26, 1977. Such gates are generally limited to controlling the flow or size of animals which pass between two pens or enclosures. If control is desired between more than two enclosures, additional gates must be provided for each pair of enclosures.

SUMMARY OF THE INVENTION

The directional and limiting gate of the present invention controls the flow and size of animals passing between two or more adjacent pens or enclosures. The gate is extremely versatile because the structural arrangement of the gate provides a wide variety of modes of operation. Vertically disposed frame members are equally spaced, as in the form of an equilateral triangle. Horizontally disposed frame members interconnect the vertically disposed frame members to complete the basic framework of the gate.

A latch and hinge apparatus permits a door of the gate to be latched between any two adjacent vertically disposed frame members, or to pivot from any one vertically disposed frame member. Tabs extend horizontally beyond the vertical edges of the door. A control rod is slideably guided by apertures in the tabs to permit upward and downward movement thereof. Each vertically disposed frame member has hinge sockets at spaced points along the member. Provided at equally spaced points along the control rod are hinge pins which engage the tabs and the hinge sockets in a pivotal relationship. A latch is provided on each control rod, said latch having a hooked end to cooperate with the upper tabs, thereby preventing the control rod from being inadvertently or undesireably moved upwardly to disengage the removable hinge pins from the hinge sockets and tabs. A spur on each lower tab engages an opposite side of the hinge socket from said tab in a manner which prevents the door from being pushed upwardly.

Bar sockets at various points along the horizontally disposed frame members receive vertically disposed bars between the top and bottom horizontal frame members. At least some of the bar sockets are variably positionable along the frame member for controlling the width of animals passing therebetween, or for holding one edge of the door in a selected position between adjacent vertically disposed frame members.

Two or more of the gates may be placed adjacent, or abutted against, each other for increasing the number of pens or enclosures between which regulation of flow or of size of animals is desired. A plurality of gates also increases the variety of modes of operation over that obtainable from a single gate.

Various other objects, features and advantages of the invention will become apparent from the following detailed disclosure when taken in conjunction with the drawings.

BRIEF DESCRIPTION OF THE DRAWINGS IN THE DRAWINGS

FIG. 1 is an elevational view of the directional and limiting gate according to the present invention;

FIG. 2 is a top plan view of the gate, illustrating in dashed lines two of the many positions to which a door of the gate may be positioned;

FIG. 3 is a fragmentary elevational view, opposite to that of FIG. 1, illustrating the blocking bar arrangement and sockets therefor;

FIG. 4 is a detail perspective view illustrating assembly of the frame members;

FIG. 5 is a fragmentary sectional view at the section line 5—5 of FIG. 3 illustrating the sockets and retaining clips for the blocking bars;

FIG. 6 is a fragmentary sectional view at sectional line 6—6 of FIG. 1 illustrating the latching and hinging arrangement for the door;

FIG. 7 is a fragmentary sectional view at sectional line 7—7 of FIG. 1 illustrating the releasable latch for the control rod;

FIG. 8 is a sectional view at sectional line 8—8 of FIG. 1 illustrating the spur which engages against a hinge socket;

FIG. 9 is a fragmentary sectional view at section line 9—9 of FIG. 1 illustrating another view of the latching and hinging arrangement;

FIG. 10 is a diagrammatic top plan view of the gate illustrating an operating mode where the door blocks one side of the gate;

FIG. 11 is a diagrammatic top plan view of the gate illustrating another operating mode where the door is held at an intermediate position by the blocking bars;

FIG. 12 is a diagrammatic top plan view of another operating mode where the door blocks one side of the gate and the blocking bars block another side; and FIG. 13 is a diagrammatic top plan view of one of many possible operating modes when two of the gates are placed together with a common side.

DESCRIPTION OF THE PREFERRED EMBODIMENT

Turning to FIG. 1, a directional and limiting gate, generally designated 11, is illustrated in elevational view. The gate 11 has a framework consisting of a plurality of vertically disposed frame members 12, 13, 14 and horizontally disposed top frame members 15 and bottom frame members 16. The vertical frame members 12, 13, 14 are generally parallel and in a equally spaced relationship, as for example in the equilateral triangle arrangement illustrated in FIG. 2. The significance of the equilateral triangle arrangement will become more apparent at a later point.

All of the frame members 12, 13, 14, 15, 16 are preferably fabricated from tubular metal stock. Tubular stock having a square across section is especially suitable since it retains other components of the gate 11 in desired positions. The horizontal frame members 15, 16 have secured at the ends thereof, as by welding, shorter transverse tubular segments 17. The segments 17 are preferably of similar width to the members 16. Referring to FIG. 4 and taking frame member 12 as representative of each of the frame members 12, 13, 14, it can be seen that member 12 has an end 19 of reduced width.

The end 19 may be a piece of tubing of smaller width than that of member 12 or may be formed by subjecting the ends of member 12 to a swaging or similar operation. The end 19 fits into the segment 17 such that apertures 20, 21 are in alignment. A threaded fastener 22 is then placed through the aligned apertures 20, 21 to secure the framework together. It will be appreciated that the framework of the gate 11 can be quickly assembled or disassembled. When disassembled, all of the components of the gate 11 are relatively planar, requiring little storage space.

One end of the vertical frame members 12, 13, 14 preferably has a reduced end 19 of greater length than the segment 17 such that the end 19 projects out of the segment 17 as illustrated in FIG. 1. This aids in anchoring the gate 11 in soil or the like.

According to one aspect of the invention, a door 23 is provided with a latching and hinging arrangement at each side thereof for opening or pivoting from any one of the vertical frame members 12, 13, 14. The door 23 can be fabricated from any of a variety of suitable materials, as for example plywood, fiberglass, or metallic sheets. Tabs 24 extend horizontally and outwardly beyond each vertical edge 25, 26 of the door 23. The door 23 may have respective upper and lower metallic edges 27, 28 to which the tabs 24 may be secured, as by welding, for greater structural rigidity.

Each of the vertical frame members 12, 13, 14 is provided at spaced points along the members 12, 13, 14 with hinge sockets 30. The sockets 30 are fastened, as by welding, to the corner of the members 12, 13, 14 which is closest to the interior of the triangular framework.

Turning now to FIG. 9, each of the tabs 24 is provided with an aperture 32 at a point intermediate the vertical edge 25 of the door 23 and the extreme outwardly projecting end 33 of the tab 24. Looking now to FIG. 6, the extreme end 33 of the tab 24 is provided with a notch 34 such that the end 33 will cover a portion of a corresponding hinge socket 30, but does not substantially block a portion of the bore through the hinge socket 30.

Returning to FIG. 1, a control rod 35 is generally disposed in a parallel relationship along the first vertical edge 25 of the door 23 and is guided by apertures 32 in each of the tabs 24. Similarly, a second control rod 36 is positioned through apertures 32 in the tabs 24 along the second side 26 of the door 23. Each of the control rods 35, 36 has a handle portion 37 for controlling the rods 35, 36 which is formed by bending an end of the rods 35, 36 in an approximately 90° angle. Secured to the control rods 35, 36 at spaced points approximately equal to the spacing between the hinge sockets 30 are hinge pins 38. The hinge pins 38 are secured to the rods 35, 36 in a generally parallel, spaced apart relationship by securing members 39.

As can be appreciated from FIG. 6, when the hinge pin 38 is placed into the bore of the hinge socket 30 by operating the handle 37 of one of the control rods downwardly, the tabs 24 on that side of the door 23 are locked into position to prevent movement away from the socket 30. However, this structural arrangement does permit pivotal movement of the hinge pin 38 in the socket 30 such that the door 23 may pivot about the pin 38 if the other side of the door 23 is unsecured. Returning now to FIG. 1, the second control rod 36 is in a downward position such that the side 26 of the door 23 is in a secured, but pivotal, relationship to vertical frame member 13. On the other hand, a first control rod 35 is in an upward position which leaves the tabs 24 along the side 25 of the door 23 unsecured with respect to the sockets 30 on the frame member 12. Thus, the side 25 of the door 23 may be moved to a different position or the control rod 35 may be moved downwardly to secure the door 23 between the vertical frame members 12, 13.

Alternatively, control rod 35 could secure the side 25 of the door 23 to the frame member 12 and side 26 of the door 23 could be moved to a different position by first releasing the latching and hinging arrangement by moving the control rod 36 upwardly. As illustrated by the dashed lines in FIG. 2, the door 23 may be pivoted to a new position between vertical frame members 13, 14 or may be pivoted to a position anywhere therebetween. Similarly, it will be appreciated that the door 23 could alternatively be positioned between the vertical frame members 12, 14 or any position therebetween. This ability to move the door 23 between any two adjacent vertical frame members 12, 13, 14 or to any position therebetween depends upon the frame members 12, 13, 14 being equally spaced such that the hinge pins 38 will align with corresponding hinge sockets 30 on the respective frame members 12, 13, 14.

Because the hinge sockets 30 are located on the inner corner of the frame members 12, 13, 14, the door 23 will be located slightly toward the interior of the triangle formed by the horizontal frame members 15 (FIG. 2).

According to another aspect of the invention, each of the control rods 35, 36 is provided with a latch 40 on the handle portion 37. The latch 40 has a collar portion 41 for pivoting about the control rod 37 and a hooked end 42 (FIG. 7) for securing the latch 40 against the under side of the tab 24. When the control rods 35, 36 are in a downward position, gravity holds the hooked end 42 of the latch 40 against the tab 24 such that the control rods 35, 36 cannot be inadvertently or undesirably moved upwardly by livestock to disengage the hinging arrangement of the door 23. However, an operator of the gate 11 can easily move the latch 40 away from the tab 24 when it is desired to disengage the hinging arrangement.

To prevent the door from being pushed upwardly by livestock attempting to pass through a space 44 (FIG. 1) between the lower edge 28 of the door 23 and the lower frame members 16, a spur 45 is provided on each of the lower tabs 24 to engage an opposite side of the hinge socket 30. This can also be seen in FIG. 8. The spur 45 is secured to the tab 24 by an offset member 46 (FIGS. 1 & 9) in a manner which does not interfere with operation of the control rods 35, 36 in the apertures 32.

Since the gate 11 is generally provided with only a single door 23 to control passage of animals through one side of the gate 11, control of passage through the remaining two sides of the gate 11 is also desirable. To this end, the gate 11 may be provided with a plurality of blocking bars 50 as illustrated in FIG. 2. Some of the bars 50 may be positioned along the exterior edges of the horizontal frame members 15, 16 by sockets 51 which are rigidly and permanently attached to the frame members 15, 16 as by welding. Such sockets 51 are positioned with respect to the vertical frame members 12, 13, 14 at a maximum spacing therefrom which prevents the smallest sized animals from passing between the bars 50 and the vertical frame members 12, 13, 14, and at a maximum spacing which does not interfere with pivoting of the gate 23 between adjacent frame members 12, 13, 14. It will be appreciated from FIG. 2 that as the gate 23 pivots between the adjacent frame members 13, 14 that the unsecured tabs 24 will swing in an arc. A portion of this arc extends exterior to one of the frame members 15. Thus, it is desirable to position the secured socket 51 at a point which does not require inconvenient removal of blocking bar 50 therefrom in order to pivot the gate 23 to a desired position.

Also provided on the horizontal frame member 15, 16 are adjustably positionable sockets 52. The sockets 52 are rigidly connected to sleeves 53, said sleeves 53 having a threaded fastener 54 therein for fixing the position of the sleeve 53 and the sockets 52 with respect to the horizontal frame members 15, 16 in the manner of a set screw. Thus, the sleeve 53 with the associated socket 52 and blocking bars 50 may be located at any point intermediate the permanently located sockets 51 for either determining the maximum width of animal which may pass between any two adjacent blocking bars 50 or for holding the door 23 at any infinitely variable point between the permanently located sockets 51.

The blocking bars 50 are preferably fabricated from a heavy duty rod stock, sufficient to withstand the forces exerted by the particular type of animals being controlled. Each of the bars 50 has a circumferential bead of weld 55 (FIG. 3) near the lower end thereof to support the weight of the bars 50 against the top edge of the sockets 51, 52 located on the lower horizontal frame member 16. To prevent inadvertent or undesirable upward pushing of the bars 50, a small diametric bore is provided through the bars 50 at a point just below the lower edge of the sockets 51, 52 located on the upper horizontal frame members 15. A resilient snap pin 56 (FIGS. 3 & 5) is received by the diametric bore in the bars 50 to prevent upward movement of the bars 50 by engaging the sockets 51, 52. However, any of the blocking bars may be quickly and easily removed, if desired, by first removing the resilient snap pin 56.

With the structure of the gate 11 now having been described, the many operating modes of the invention will now be examined. Turning to FIG. 10, there is shown in diagrammatic form a gate 11 in which a door 23 blocks all passage through the side 60. However, unimpeded passage is permitted between the sides 61, 62. In accordance with the teachings of the invention, it will be realized that the door 23 could be repositioned to alternatively block passage along either of the sides 61, 62.

In FIG. 11, the door 23 is held at an intermediate position by a pair of blocking bars 50. Passage of appropriately sized animals occurs between the side 61 and either of the sides 60, 62. However, direct passage between sides 60, 62 is not permitted. Again, it will be realized that the door 23 and the blocking bars 50 could readily and easily be relocated to regulate the size of the animals passing from sides 60 or 62 instead of from side 61.

In FIG. 12, the door 23 blocks the side 60 while the equally spaced blocking bars 50 along side 61 also prevent any animals from passing therethrough. Thus, even though side 62 is unimpeded, no animals can pass through the gate 11 since sides 60, 61 are both blocked. If some of the bars 50 were spaced further apart, smaller sized animals could pass between the sides 61, 62.

In FIG. 13, a pair of gates 11 are abutted together along one common side 62 thereof. Such a combination of two gates 11 provides four sides 60, 61, 60a, 61a for controlling the flow of animals between four pens or enclosures. In the particular embodiment illustrated, passage of appropriately sized animals may occur between the sides 61, 61a, with the sides 60, 60a being blocked by the doors 23.

Many other modes of operation will become apparent to those skilled in the art. As a further example, the door 23 can be entirely removed from the gate 11 by simply and conveniently moving both control rods 35, 36 upwardly to remove the hinge pins 38 from the hinge sockets 30. Operation of the gate 11 is then effected by positioning of the control bars 50.

Despite the versatility of the gate 11 in achieving the many operating modes, the structure thereof is not particularly complex. Furthermore, all of the components can be fabricated from inexpensive materials such that economy of manufacture is not sacrificed.

It will be understood the various changes and modifications may be made without departing form the spirit of the invention as defined in the following claims, and equivalents thereof.

I claim:

1. A directional and limiting gate for controlling the flow of livestock between more than two enclosures and for limiting the size of livestock passing through said gate, said gate comprising:

three vertically disposed frame members, said frame members in a generally parallel and equally spaced apart relationship in the form of an equilateral triangle;

hinge socket means provided at spaced points along said frame members;

a door for operating in between said frame members;

tab means horizontally extending outwardly beyond each vertical edge of said door for cooperation with said hinge socket means;

removable pin means for engaging said tab means and said hinge socket means to provide pivotal movement of said door about said pin means;

first control means interconnected to each removable pin means along a first vertical edge of the door for inserting or removing said pin means from the respective hinge socket means;

second control means interconnected to each removable pins means along a second vertical edge of the door for inserting or removing said pin means from the respective hinge socket means such that either edge of said door may be independently latched to, or opened from, any frame member and said door may be latched between any two of the three frame members or may be pivoted from any frame member.

2. A directional and limiting gate for controlling the flow of livestock between various enclosures and for limiting the size of livestock passing through such said gate, said gate comprising:

three vertically disposed frame members, said frame members in a generally parallel and spaced apart relationship in the form of an equilateral triangle;

hinge socket means provided at spaced points along said frame members;

a door for operating in between said frame members;

tab means horizontally extending outwardly beyond each vertical edge of said door for cooperation with said hinge socket means;

removable pin means for engaging said tab means and said hinge socket means to provide pivotal movement of said door about said pin means;

first control means interconnected to each removable pin means along a first vertical edge of the door for inserting or removing said pin means from the respective hinge socket means;

second control means interconnected to each removable pin means along a second vertical edge of the door for inserting or removing said pin means from the respective hinge socket means such that either edge of said door may be independently latched to, or opened from, any frame member and said door may be latched to any two of the three frame members.

a plurality of vertically disposed bars for limiting the width of animals passing through one side of said gate between two of said frame members; and means for positioning said bars at points between said two frame members.

* * * * *